US008938320B2

(12) United States Patent
Ooba et al.

(10) Patent No.: US 8,938,320 B2
(45) Date of Patent: Jan. 20, 2015

(54) REGIONAL ENERGY MANAGEMENT SYSTEM, REGIONAL ENERGY INTEGRATED MANAGEMENT DEVICE AND REGIONAL ENERGY INTEGRATED MANAGEMENT METHOD USED IN REGIONAL ENERGY MANAGEMENT SYSTEM

(75) Inventors: Yoshikazu Ooba, Hachioji (JP);
Nobutaka Nishimura, Koganei (JP);
Hideki Oono, Koganei (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 13/413,097

(22) Filed: Mar. 6, 2012

(65) Prior Publication Data

US 2012/0221165 A1 Aug. 30, 2012

Related U.S. Application Data

(63) Continuation of application No. PCT/JP2012/052405, filed on Feb. 2, 2012.

(30) Foreign Application Priority Data

Feb. 23, 2011 (JP) ................ P2011-037003

(51) Int. Cl.
*G05D 3/12* (2006.01)
*G05D 5/00* (2006.01)
(Continued)

(52) U.S. Cl.
CPC ............. *H04L 12/2825* (2013.01); *Y02B 10/14* (2013.01); *Y02E 40/72* (2013.01); *Y02E 10/563* (2013.01);
(Continued)

(58) Field of Classification Search
USPC ......................... 700/286, 291, 297
See application file for complete search history.

(56) References Cited

U.S. PATENT DOCUMENTS 6,785,592 B1 * 8/2004 Smith et al. .................. 700/291
7,274,975 B2 * 9/2007 Miller .......................... 700/295
(Continued)

FOREIGN PATENT DOCUMENTS

JP 9-135536 5/1997
JP 2002-44870 2/2002
(Continued)

OTHER PUBLICATIONS

International Search Report issued by the Japanese Patent Office on May 1, 2012, for International Patent Application No. PCT/JP2012/052405.

(Continued)

*Primary Examiner* — Ronald Hartman, Jr.
(74) *Attorney, Agent, or Firm* — Finnegan, Henderson, Farabow, Garrett & Dunner, L.L.P.

(57) ABSTRACT

According to embodiments, a regional energy integrated management device for managing energy in a region containing multiple buildings includes an information acquisition unit, an information generator, and an instruction transmitter. The information acquisition unit acquires energy management information containing energy shortage and surplus information of a building from the multiple buildings. The information generator generates regional energy management information for mutually adjusting energy supply between different buildings in the management target region based on the energy management information on the multiple buildings thus acquired. The instruction transmitter transmits the generated regional energy management information to the corresponding buildings.

20 Claims, 5 Drawing Sheets

(51) Int. Cl.
*G05D 9/00* (2006.01)
*G05D 11/00* (2006.01)
*G05D 17/00* (2006.01)
*H04L 12/28* (2006.01)
*H02J 3/46* (2006.01)
*H02J 13/00* (2006.01)
*H02J 3/38* (2006.01)

(52) U.S. Cl.
CPC .............. Y04S 10/123 (2013.01); Y02B 70/325 (2013.01); Y02E 10/763 (2013.01); *H02J 3/46* (2013.01); Y04S 20/228 (2013.01); H02J 3/383 (2013.01); *H02J 13/0006* (2013.01); *H02J 3/381* (2013.01); H02J 3/386 (2013.01); Y04S 10/12 (2013.01)
USPC ........................... 700/286; 700/291; 700/297

(56) References Cited

U.S. PATENT DOCUMENTS

| | | | |
|---|---|---|---|
| 7,930,070 B2 * | 4/2011 | Imes | 700/291 |
| 8,019,697 B2 * | 9/2011 | Ozog | 705/412 |
| 8,417,391 B1 * | 4/2013 | Rombouts et al. | 700/291 |
| 8,442,698 B2 * | 5/2013 | Fahimi et al. | 700/297 |
| 8,457,802 B1 * | 6/2013 | Steven et al. | 700/291 |
| 8,463,450 B2 * | 6/2013 | Martin | 700/291 |
| 2002/0103745 A1 * | 8/2002 | Lof et al. | 705/37 |
| 2008/0195255 A1 * | 8/2008 | Lutze et al. | 700/291 |
| 2010/0138363 A1 * | 6/2010 | Batterberry et al. | 705/412 |
| 2010/0222934 A1 | 9/2010 | Iino et al. | |
| 2011/0015801 A1 * | 1/2011 | Mazzarella | 700/297 |
| 2012/0029720 A1 * | 2/2012 | Cherian et al. | 700/297 |
| 2012/0095613 A1 * | 4/2012 | Tsuda | 700/297 |
| 2012/0130556 A1 * | 5/2012 | Marhoefer | 700/291 |
| 2012/0232711 A1 * | 9/2012 | Kiuchi et al. | 700/291 |
| 2012/0296482 A1 * | 11/2012 | Steven et al. | 700/291 |
| 2013/0013121 A1 * | 1/2013 | Henze et al. | 700/291 |
| 2013/0184882 A1 * | 7/2013 | Momose et al. | 700/286 |
| 2013/0261823 A1 * | 10/2013 | Krok et al. | 700/291 |

FOREIGN PATENT DOCUMENTS

| | | |
|---|---|---|
| JP | 2003-289627 | 10/2003 |
| JP | 2004-15882 | 1/2004 |
| JP | 2004-355838 | 12/2004 |
| JP | 2005-245180 | 9/2005 |
| JP | 2006-74952 | 3/2006 |
| JP | 2006-340539 | 12/2006 |
| JP | 2010-204833 | 9/2010 |
| JP | 2010-220428 | 9/2010 |

OTHER PUBLICATIONS

Notification of the First Office Action issued by The State Intellectual Property Office of the People's Republic of China on May 5, 2014, for Chinese Patent Application No. 201280000056.6, and English-language translation thereof.

Notice of Reasons for Refusal issued by the Japanese Patent Office on Jun. 3, 2014, for Japanese Patent Application No. 2011-037003, and English-language translation thereof.

Yamamoto et al., "Evaluation of the Reduction in CO2 Emission by Applying Micro-Grid to Home Energy Supply System," IEEJ Transactions on Electronics, Information and Systems (2008), pp. 32-38 and English Abstract.

Notice of Reasons for Refusal issued by the Japanese Patent Office on Feb. 4, 2014, for Japanese Patent Application No. 2011-037003, and English-language translation thereof.

* cited by examiner

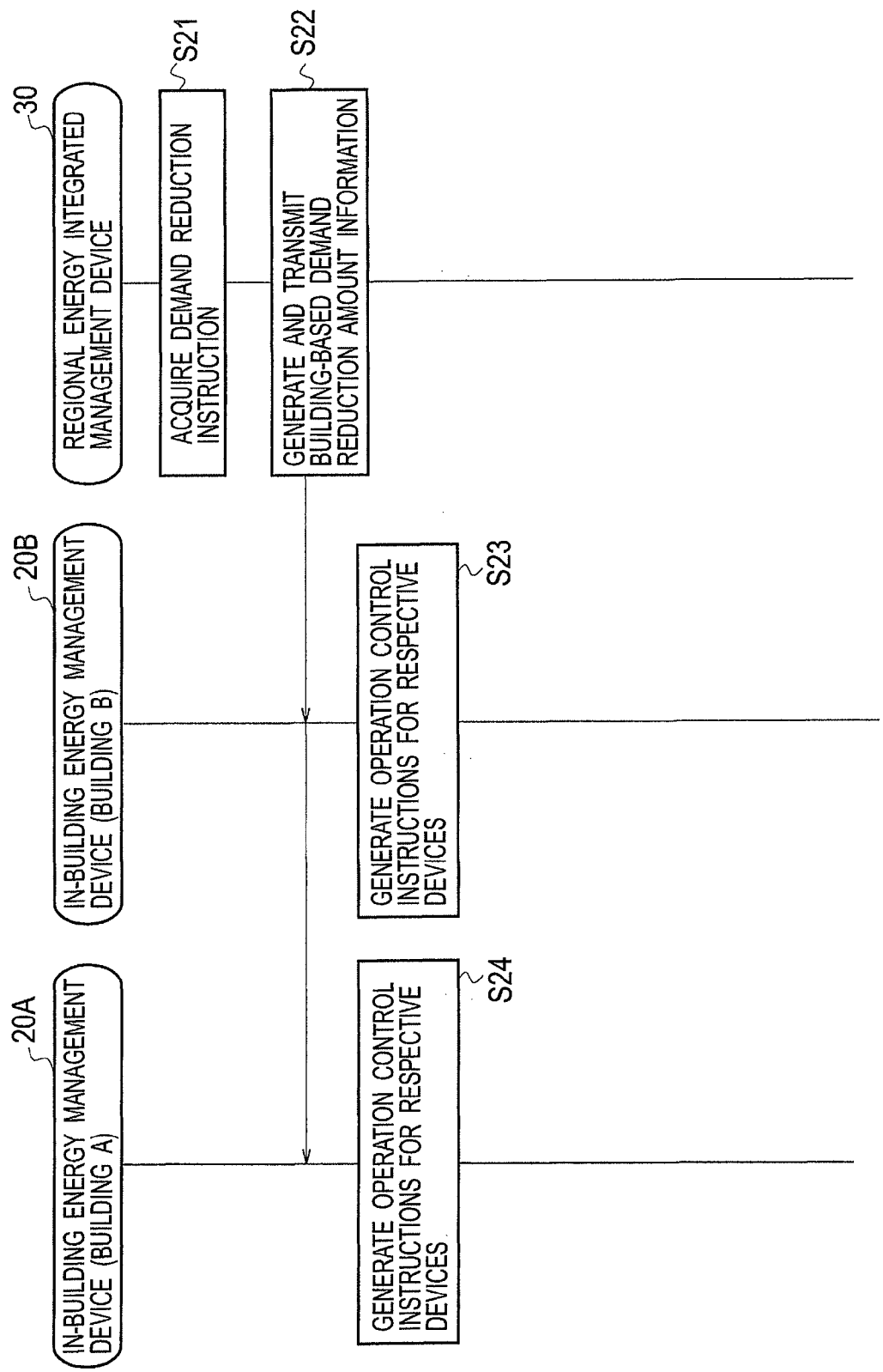

REGIONAL ENERGY MANAGEMENT SYSTEM, REGIONAL ENERGY INTEGRATED MANAGEMENT DEVICE AND REGIONAL ENERGY INTEGRATED MANAGEMENT METHOD USED IN REGIONAL ENERGY MANAGEMENT SYSTEM

CROSS-REFERENCE TO RELATED APPLICATIONS

This application is a Continuation of PCT Application No. PCT/JP2012/052405, filed on Feb. 2, 2012, and claims the priority of Japanese Patent Application No. 2011037003, filed on Feb. 23, 2011, the content of both of which is incorporated herein by reference.

FIELD

Embodiments described herein generally relate to a regional energy management system and to a regional energy integrated management device and a regional energy integrated management method used in the system.

BACKGROUND

Energy management systems that utilize BAS (building automation systems), BEMS (building and energy management systems), and so forth have heretofore been proposed in order to optimize use efficiency of energy such as electric power and heat in buildings such as office buildings and factories.

These energy management systems also include a supply-demand control technique which matches power generation and power consumption. This matching is made by using, in combination with power from a bulk power system, renewable energy supplied from power generation such as wind and photovoltaic power generation, energy supplied from an energy storage device or the like.

BRIEF DESCRIPTION OF THE DRAWINGS

FIG. 5 is a sequence diagram showing operations in which the regional energy management system according to the embodiment executes processing of responding to a demand reduction instruction.

DETAILED DESCRIPTION

A regional energy management system will be described as an embodiment of the present invention. The regional energy management system covers a region containing a group of buildings including a building A, a building B, and a building C as a management target and that integrally manages energy used and generated within the group of building in this region.

(A Configuration of a Regional Energy Management System According to the Embodiment)

Figure 1:
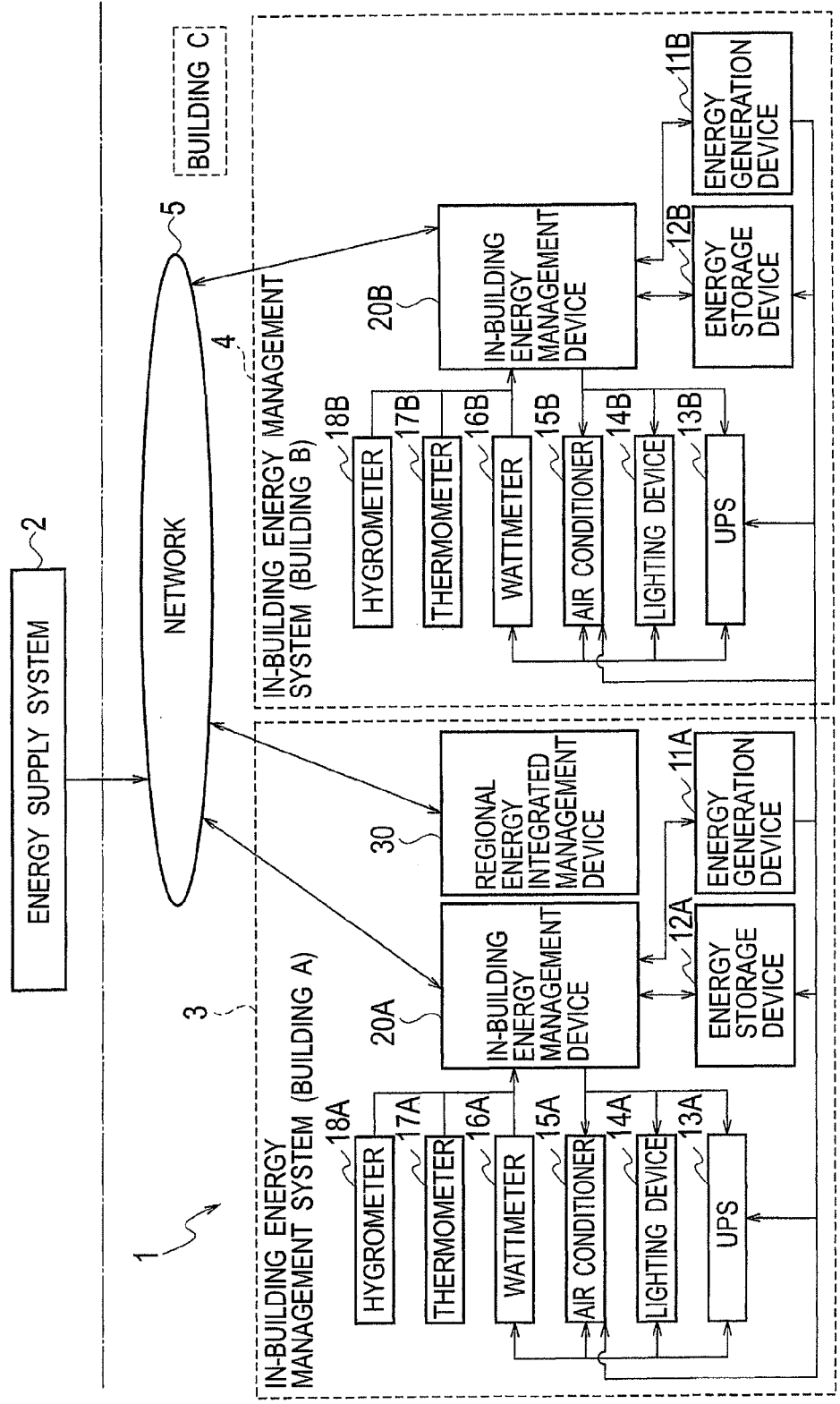
FIG. 1 is an overall view showing a configuration of a regional energy management system according to an embodiment of the present invention.

A configuration of a regional energy management system according to this embodiment will be described with reference to FIG. 1.

A regional energy management system 1 of this embodiment includes an in-building energy management system 3 configured to manage energy which is used, generated, and stored inside the building A, and an in-building energy management system 4 configured to manage energy which is used, generated, and stored inside the building B. These in-building energy management systems are connected through a network 5 to an energy supply system 2 of an electric power company or the like who manages supply power. Here, the building C is assumed to lack an in-building energy management system and to be therefore unable to acquire in-building energy management information.

The in-building energy management system 3 includes an energy generation device 11A installed in the building A, an energy storage device 12A, a UPS (uninterruptible power system) 13A, a lighting device 14A and an air conditioner 15A serving as loading devices, a wattmeter 16A, a thermometer 17A, and a hygrometer 18A serving as measuring instruments, an in-building energy management device 20A connected to these devices and to a network 5, and a regional energy integrated management device 30 connected to the network 5.

The regional energy integrated management device 30 is connected to the network 5 so that the device 30 can exchange a variety of information with the energy supply system 2 and with the in-building energy management systems in the buildings (i.e., the in-building energy management systems 3 and 4 according to this embodiment).

The building A and the building B are located close to each other. The energy generation device 11A, the energy storage device 12A, the UPS 13A, the lighting device 14A, and the air conditioner 15A in the building A are interconnected to an energy generation device 11B, an energy storage device 12B, a UPS 13B, a lighting device 14B, and an air conditioner 15B in the building B so as to allow energy supply to and from one another. Here, all the devices do not always have to be interconnected to one another and some devices may be interconnected instead.

The energy generation device 11A is the device such as a photovoltaic power generator or a wind power generator, which is configured to generate electric energy by converting renewable energy such as solar energy or wind energy into electric power.

The energy storage device 12A is the device such as a battery, a heat storage layer, a water tank, a flywheel or the like, which is configured to store the electric energy generated by the energy generation device 11A in an appropriate state to conform to usage thereof. For example, in the case of the battery, the supplied electric energy is stored in a general stationary battery. In the case of the heat storage layer, hot water is generated by means of heat exchange with a heating coil or the like using the supplied electric energy so that the energy is stored in the form of thermal energy. In the case of the water tank, water stored in the tank is pumped up to a high place by use of the supplied power so that the energy is stored in the form of potential energy. In the case of the flywheel, the flywheel is rotated by use of the supplied power so that the energy is stored in the form of kinetic energy.

The UPS 13A supplies the electric energy to the lighting device 14A and the air conditioner 15A as loading devices.

Here, the electric energy is electric energy supplied from the energy supply system 2 or the energy generation device 11A, electric energy stored in the energy storage device 12A, or electric energy converted from the thermal energy, the potential energy or the kinetic energy.

The lighting device 14A is operated by using the electric energy supplied from the UPS 13A. Alternatively, the electric energy may be supplied directly from the energy storage device 12A in the case of having installed a direct-current compatible device such as an LED light compatible with a direct-current power source, which is currently under research and development.

The air conditioner 15A is operated by using the electric energy supplied form the UPS 13A or the hot water supplied form the energy storage device 12A.

The wattmeter 16A measures the electric energy (electric power amount) used in the building by measuring the power supplied from the UPS 13A to the loading devices including the lighting device 14A and the air conditioner 15A.

The thermometer 17A measures temperatures inside and outside the building used for energy management in the building.

The hygrometer 18A measures humidities inside and outside the building used for energy management in the building.

Figure 2:
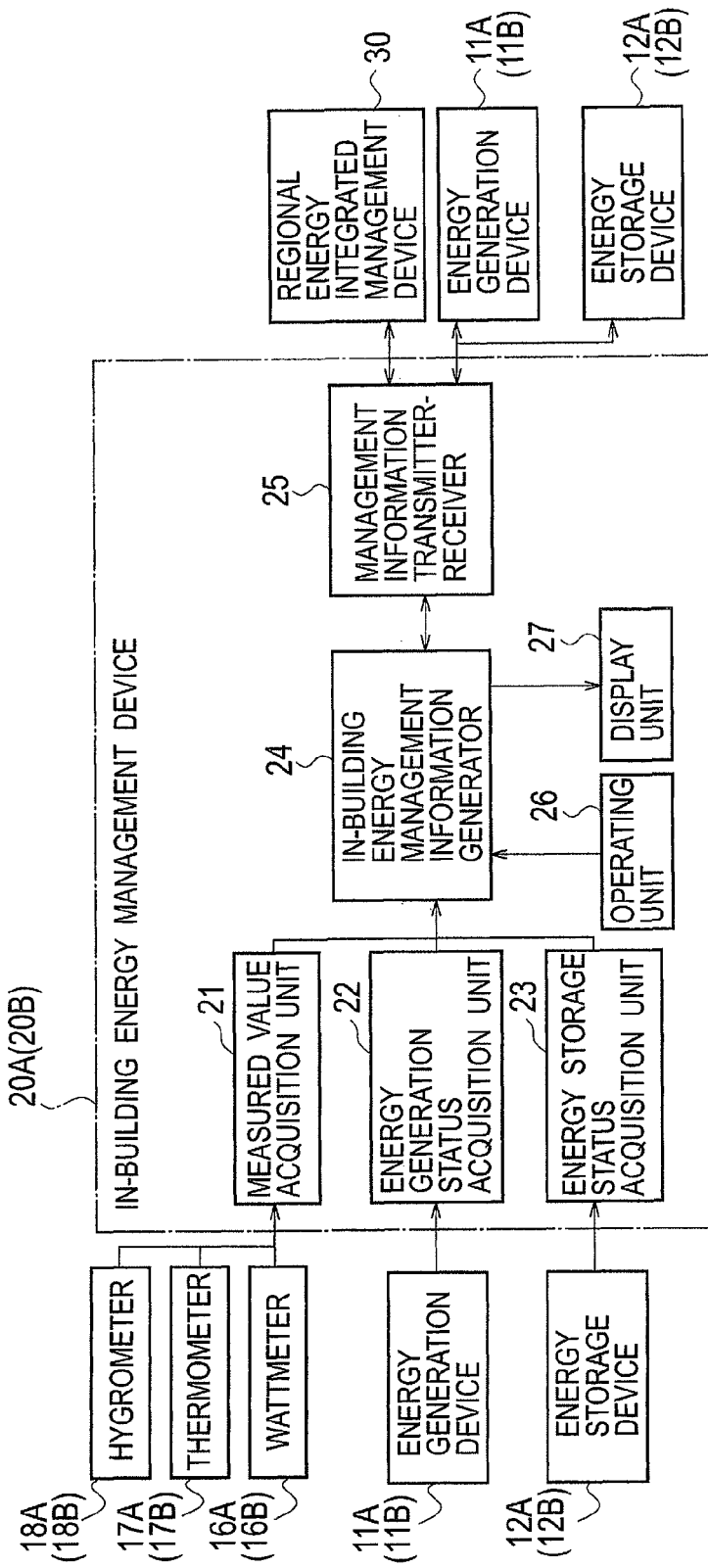
FIG. 2 is a block diagram showing a configuration of an in-building energy management device used in the regional energy management system according to the embodiment.
Figure 3:
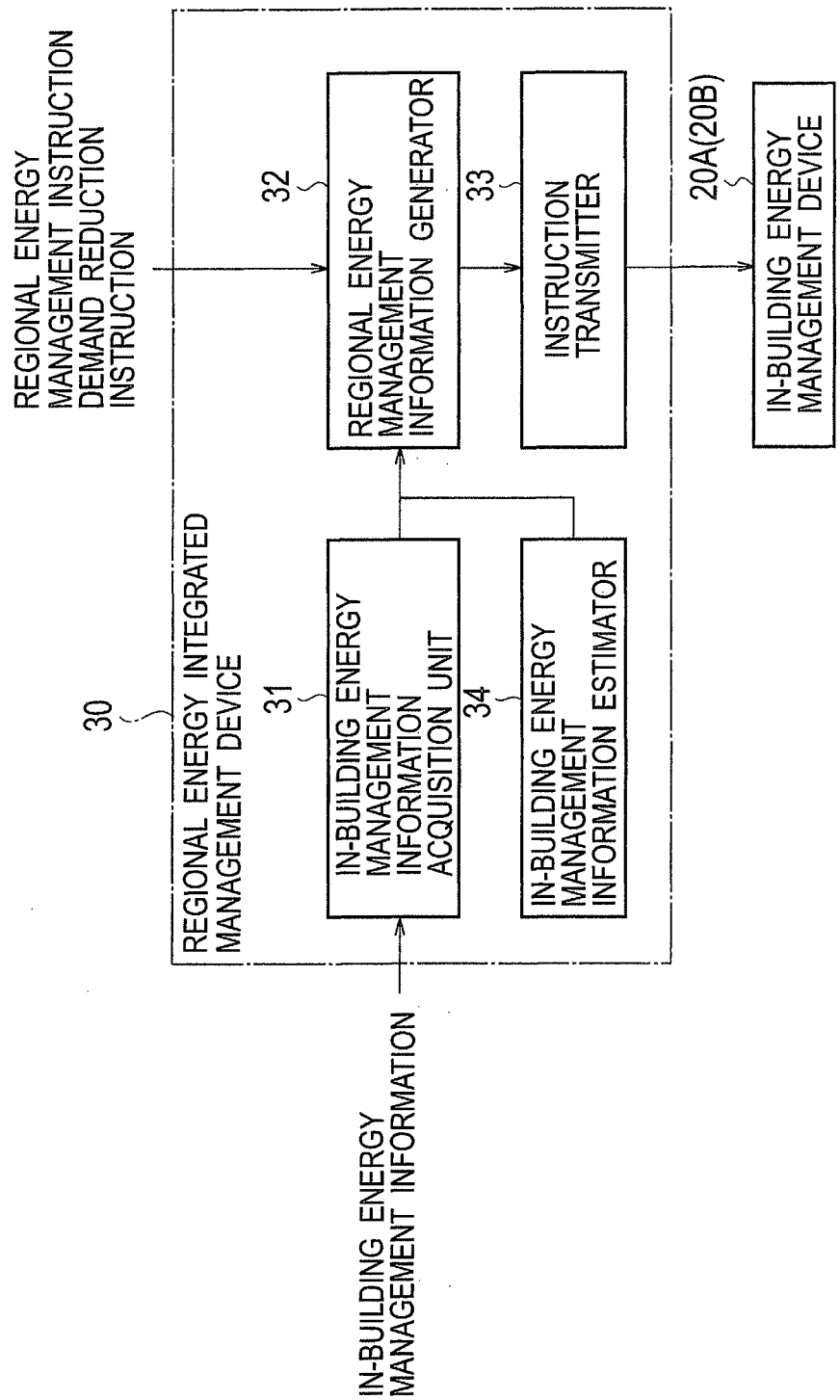
FIG. 3 is a block diagram showing a configuration of a regional energy integrated management device used in the regional energy management system according to the embodiment.

The in-building energy management device (hereinafter referred to as the energy management device) 20A manages the energy which is used, generated, and stored in the building A. As shown in FIG. 2, the energy management device 20A includes a measurement value acquisition unit 21, an energy generation status acquisition unit 22, an energy storage status acquisition unit 23, an in-building energy management information generator (a first information generator) 24, a management information transmitter-receiver 25, an operating unit 26, and a display unit 27.

The measurement value acquisition unit 21 acquires an electric energy (electric power amount measurement value) measured with the wattmeter 16, a temperature (temperature measurement value) measured with the thermometer 17, and a humidity (humidity measurement value) measured with the hygrometer 18.

The energy generation status acquisition unit 22 acquires energy generation status information indicating an amount of energy generated by the energy generation device 11A, for example.

The energy storage status acquisition unit 23 acquires energy storage status information indicating an amount of energy stored by the energy storage device 12, for example.

The in-building energy management information generator (hereinafter simply referred to as the information generator) 24 generates in-building energy management information (hereinafter referred to as energy management information) by using the energy generation status information, the energy storage status information, the electric energy, the temperature, and the humidity. Here, the energy management information includes shortage information and surplus information on the energy in the building as well as operation control information on the energy generation device 11A, the energy storage device 12A, the UPS 13A, the lighting device 14A, and the air conditioner 15A. The energy generation status information is acquired by the energy generation status acquisition unit 22, the energy storage status information is acquired by the energy storage status acquisition unit 23, and the electric energy, the temperature, and the humidity are acquired by the measurement value acquisition unit 21. Moreover, the information generator 24 generates the energy management information including the operation control information on the energy generation device 11A, the energy storage device 12A, the UPS 13A, the lighting device 14A, and the air conditioner 15A based on regional energy management information and demand reduction amount information (such as information on an energy use amount reduction request) transmitted from the regional energy integrated management device 30.

The management information transmitter-receiver (hereinafter referred to as the transmitter-receiver) 25 transmits the energy management information generated by the information generator 24 to the regional energy integrated management device 30 and also to the energy generation device 11A, the energy storage device 12A, the UPS 13A, the lighting device 14A, and the air conditioner 15A as appropriate. Moreover, the transmitter-receiver 25 receives the regional energy management information and the demand reduction amount information transmitted from the regional energy integrated management device 30 and forwards these pieces of information to the information generator 24.

The operating unit 26 is operated by an administrator of the in-building energy management system 3 and is configured to perform operations for displaying the energy management information generated by the information generator 24, for example.

The display unit 27 displays the energy management information generated by the information generator 24 based on the operations executed by using the operating unit 26.

In the meantime, the in-building energy management system 4 includes the energy generation device 11B installed in the building B, the energy storage device 12B, the UPS (uninterruptible power system) 13B, the lighting device 14B and the air conditioner 15B serving as loading devices, a wattmeter 16B, a thermometer 17B, a hygrometer 18B, and an in-building energy management device (hereinafter referred to as the energy management device) 20B connected to these devices and to the network 5. The energy management device 20B manages energy which is used, generated, and stored inside the building B.

Functions of the devices in the building B are similar to those of the corresponding devices in the building A. Accordingly, detailed description thereof will be omitted.

The regional energy integrated management device 30 is the device configured to perform integrated management of the energy used and generated in the building A, the building B, and the building C located in the management target region. The device 30 includes an in-building energy management information acquisition unit 31, a regional energy management information generator (a second information generator) 32, an instruction transmitter 33, and an in-building energy management information estimator 34.

The in-building energy management information acquisition unit (hereinafter referred to as the information acquisition unit) 31 acquires the energy management information transmitted from the transmitter-receivers 25 of the respective buildings (the building A and the building B).

The regional energy management information generator (hereinafter referred to as the information generator) 32 generates regional energy management information for adjusting energy supply among different buildings in the management target region based on the energy management information on the multiple buildings acquired by the information acquisition unit 31. Moreover, when a demand reduction instruction for reducing energy consumption in the region is transmitted from the energy supply system 2 through the network 5, the information generator 32 generates building-based demand reduction amount information, which indicates a demand reduction amount allocated to each building from the total demand reduction amount requested by the demand reduction instruction, based on the acquired energy management information on the multiple buildings.

The instruction transmitter 33 transmits the regional energy management information and the building-based demand reduction amount information generated by the information generator 32 to the energy management device of the corresponding building (i.e., the energy management device 20A or 20B).

The in-building energy management information estimator 34 generates estimated management information which is estimated information of the energy management information concerning one of the buildings inside the target region, on which the energy management information is unavailable.

(Operations of the Regional Energy Management System According to the Embodiment)

Figure 4:
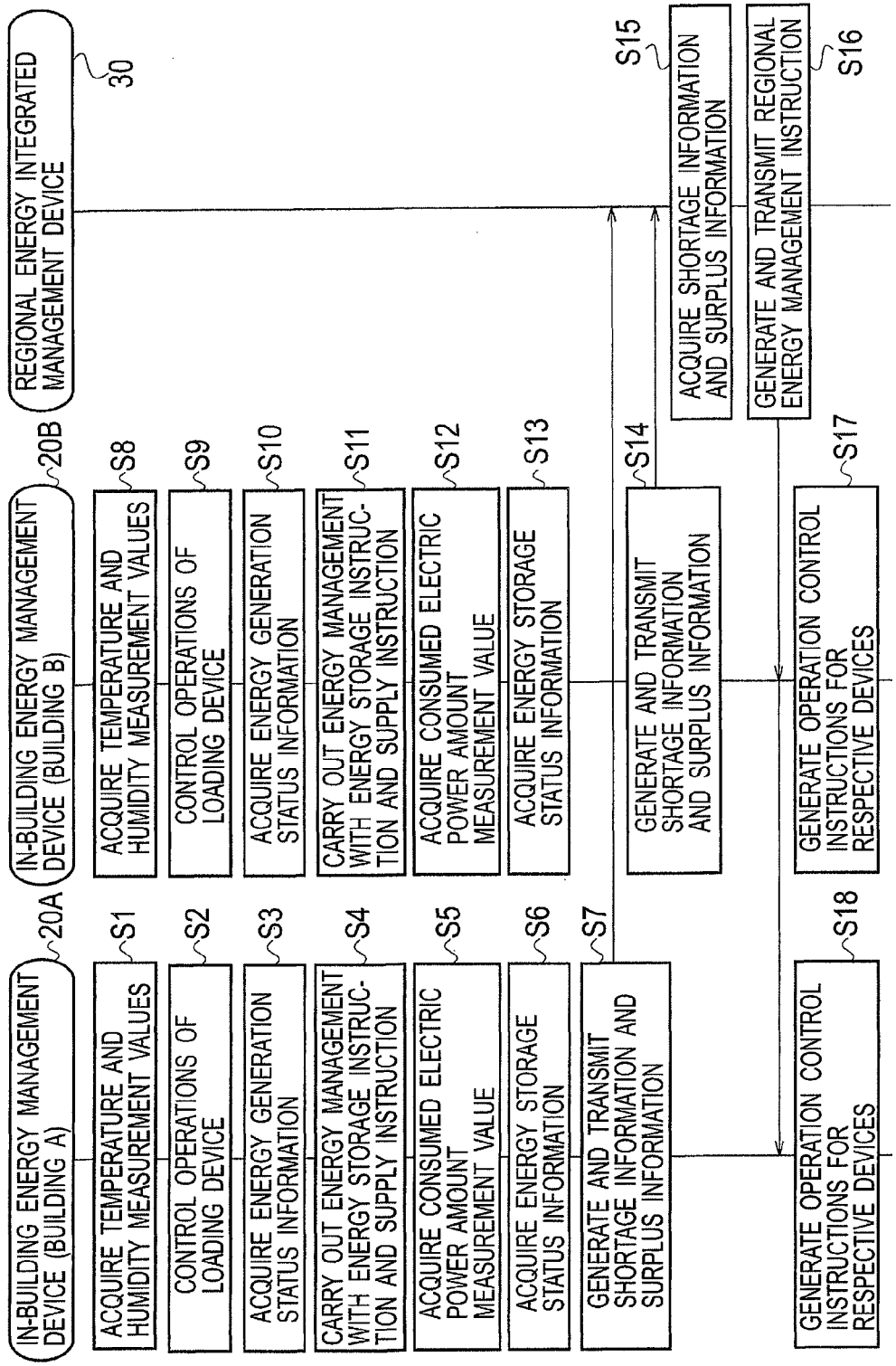
FIG. 4 is a sequence diagram showing operations in which the regional energy management system according to the embodiment executes processing for energy distribution adjustment among multiple buildings.

Operations of the regional energy management system 1 of this embodiment will be described below regarding the case of executing (1) processing for energy distribution adjustment among multiple buildings and (2) processing of responding to a demand reduction instruction. (1) Processing for energy distribution adjustment among multiple buildings Operations when the regional energy management system 1 of this embodiment executes the processing for energy distribution adjustment between the building A and the building B will be described below with reference to a sequence diagram in FIG. 4.

First, among the buildings in the management target region, the temperatures (temperature measurement values) inside and outside the building A, which is under in-building energy management, are measured with the thermometer 17A. Meanwhile, the humidities (humidity measurement values) inside and outside the building A are measured with the hygrometer 18A. The temperatures and the humidities are acquired by the measured value acquisition unit 21 of the energy management device 20A (step S1).

The temperatures and the humidities acquired by the measured value acquisition unit 21 are then forwarded to the information generator 24, and operation control information for the lighting device 14A and the air conditioner 15A is generated based on the temperatures and the humidities. The operation control information thus generated is transmitted from the transmitter-receiver 25 to the lighting device 14A and the air conditioner 15A to control operations thereof (step S2).

Meanwhile, electric energy is generated in the energy generation device 11A located in the building A, which is formed of the photovoltaic power generator, the wind power generator or the like, by converting renewable energy such as solar energy or wind energy into the electric energy.

The amount and other parameters of the electric energy generated by the energy generation device 11A are acquired as the energy generation status information by the energy generation status acquisition unit 22 of the energy management device 20A (step S3).

The energy generation status information acquired by the energy generation status acquisition unit 22 is forwarded to the information generator 24. Accordingly, an energy storage instruction to the energy storage device 12A and an energy supply instruction to the UPS 13A are generated based on this energy generation status information and the operation control information for the lighting device 14A and the air conditioner 15A generated in step S3. The energy storage instruction and the energy supply instruction thus generated are transmitted from the transmitter-receiver 25 to the energy generation device 11A, the energy storage device 12A, and the UPS 13A, so that the energy management is carried out (step S4).

For example, when the operations of the lighting device 14A and the air conditioner 15A based on the generated operation control information is possible by use of the electric energy generated by the energy generation device 11A, the information generator 24 generates the energy supply instruction such that the electric energy generated by the energy generation device 11A is supplied to the lighting device 14A and to the air conditioner 15A through the UPS 13A. Then, this energy supply instruction is transmitted to the energy generation device 11A and the UPS 13A. Here, if a direct-current power can be supplied from the energy generation device 11A to the loading device such as the lighting device 14A, for example, then the energy supply instruction is generated such that the electric energy generated by the energy generation device 11A is supplied directly to the lighting device 14A without using the UPS 13A.

In the meantime, when the energy generation device 11A generates electric energy in excess of a required amount to be supplied to the lighting device 14A and the air conditioner 15A, the information generator 24 generates the energy storage instruction such that surplus electric energy thus generated by the energy generation device 11A is stored in the energy storage device 12A. This energy storage instruction is transmitted to the energy generation device 11A and the energy storage device 12A.

Here, the amount of the electric energy supplied from the UPS 13A to the lighting device 14A and the air conditioner 15A is measured with the wattmeter 16A and is acquired by the measurement value acquisition unit 21 of the energy management device 20A as an electric energy consumed by the building A (step S5). The consumed electric energy acquired by the measurement value acquisition unit 21 is then forwarded to the information generator 24.

Meanwhile, the amount of energy stored in the energy storage device 12A is acquired by the energy storage status acquisition unit 23 of the energy management device 20A as the energy storage status information (step S6). The energy storage status information acquired by the energy storage status acquisition unit 23 is then forwarded to the information generator 24.

Thereafter, the information generator 24 generates the energy shortage and surplus information of the building by use of the energy generation status information, the consumed electric energy, and the energy storage status information thus acquired. The energy shortage and surplus information of the building thus generated is transmitted to the regional energy integrated management device 30 through the network 5 (step S7).

Similarly, in the building B, the information generator 24 of the energy management device 20B generates operation control information for the lighting device 14B and the air conditioner 15B, an energy storage instruction to the energy storage device 12B, an energy supply instruction to the UPS 13B, and energy shortage and surplus information of the building (steps S8 to S13). The energy shortage and surplus information of the building thus generated is transmitted to the regional energy integrated management device 30 through the network 5 (step S14).

In the regional energy integrated management device 30, the information acquisition unit 31 acquires the energy shortage and surplus information of the buildings transmitted from the energy management devices 20A and 20B (step S15), and the information generator 32 generates the regional energy management information for adjusting the energy supply based on the information so that an energy-saving effect on the building A and the building B is improved and $CO_2$ emission is suppressed (step S16).

For example, when the shortage information indicating shortage in thermal energy is acquired from the energy management device 20A in the building A and the surplus information indicating storage of hot water as surplus thermal energy is acquired from the energy management device 20B in the building B, the regional energy management information for distribution is generated for providing (selling) the hot water from the building B to the building A by pumping the water through pipes.

The generated regional energy management information is transmitted to the energy management device 20A in the building A and the energy management device 20B in the building B (step S17).

Then, the operation control instructions for devices in the buildings to deal with the acquired regional energy management information are generated by the energy management devices 20 and are transmitted to the relevant devices (steps S17 and S18).

For example, when the regional energy management information for providing the hot water from the building B to the building A as described above is transmitted from the regional energy integrated management device 30, this regional energy management information is acquired by the information generator 24 of the energy management device 20B through the transmitter-receiver 25 in the building B, and the energy storage device 12B in the building B generates a thermal energy provision instruction for supplying the hot water stored as the thermal energy to the building A.

The generated thermal energy provision instruction is transmitted to the energy storage device 12B, and the energy storage device 12B performs control so that the stored hot water is provided to the building A Meanwhile, the various information generated by the information generator 24 are displayed on the display unit 27 and used for monitoring as the administrator of the in-building energy management system 3 operates the operating unit 26. In addition, if needed, by allowing the administrator to confirm the display on the display unit 27 upon issuance of the control instruction and to check whether or not it is appropriate to carry out the control instruction by using the operating unit 26, it is also possible to form a mechanism in which the administrator has a lead time before judging whether or not it is appropriate to carry out the control instruction. (2) Processing of responding to a demand reduction instruction With reference to a sequence diagram in FIG. 5, description will be provided for operations performed by the regional energy management system 1 upon transmission of the demand reduction instruction from the energy supply system 2 while the above-mentioned processing for energy distribution adjustment between the building A and the building B is performed.

First, when the demand reduction instruction is transmitted from the energy supply system 2 to the management target region, this demand reduction instruction is acquired by the regional energy integrated management device 30 (step S21).

The demand reduction instruction is acquired by the information generator 32 in the regional energy integrated management device 30, and the building-based demand reduction amount information, which indicates a demand reduction amount allocated to each building from the total demand reduction amount requested by the demand reduction instruction, is generated based on the acquired energy management information on the multiple buildings.

At this time, the in-building energy management information estimator 34 generates the estimated management information representing the estimated information of the energy management information on a building among the buildings in the target region for which the energy management information is not available, such as the energy management information concerning the building C. The building-based demand reduction amount information is generated by using this information. This estimated management information may be generated based on a gross floor area of the building and on the equipment installed therein, or may be generated by using a technique to perform simulation of the equipment in the building when available.

Meanwhile, concerning a building for which the energy management information becomes unavailable due to a failure or the like while the system is in operation, the estimated management information is generated by employing an estimation method based on an autoregressive model with use of the energy management information acquired in chronological order before such information becomes unavailable, or employing an estimation method based on date and time information in a similar environment selected from past information, for example.

Then, the building-based demand reduction amount information is generated such that the required demand reduction is performed in the buildings where the energy management is conducted by the in-building energy management system while assuming that the demand reduction cannot be performed in the building for which the energy management information is acquired by use of the estimated management information.

The building-based demand reduction amount information thus generated is transmitted to the energy management devices 20A and 20B in the corresponding buildings (step S22).

The information generators 24 in the respective energy management devices 20A and 20B acquire the transmitted building-based demand reduction amount information through the transmitter-receivers 25. The operation control instructions for the devices in the buildings are generated based on this building-based demand reduction amount information and are transmitted to these devices (steps S23 and S24).

According to the above-described embodiment, it is possible to perform efficient energy management not only inside an individual building but also among multiple buildings in a management target region. Hence the buildings in the whole region can be controlled so that an energy-saving effect is improved and $CO_2$ emission is suppressed.

Moreover, a building for which any management information is unavailable can be included as a management target by using an appropriate measure for generating the estimated information.

Although the present invention has been described with reference to the embodiment, it is to be understood that the embodiment is merely an example and does not intend to limit the scope of the present invention. The present invention can also be implemented by other embodiments, and various omissions, replacements, and alterations are possible without departing from the gist of the invention. Such embodiments and modifications thereof are encompassed by the gist and scope of the present invention as defined by the appended claims and equivalents thereto.

For example, the embodiment has described the case where the regional energy integrated management device is installed in the in-building energy management system in the building A. However, the present invention is not limited to this configuration, and the regional energy integrated management device may be installed independently of any of the in-building energy management systems.

In addition, as for an operation instruction for each device for responding to the demand reduction instruction described in the present disclosure, the display unit and the operating unit may be configured to allow an administrator of each building to check in advance the operation instruction and select whether to execute or cancel the operating instruction depending on the situation or a request by an owner of the system. This configuration, however, may encounter a failure in achievement of overall energy-saving efficiency at a desired level in some cases.

What is claimed is:

1. A regional energy management system comprising:
a plurality of energy management devices each configured to individually manage energy used, generated, and stored in a corresponding one of a plurality of buildings; and
a regional energy integrated management device connected to the plurality of energy management devices via a network and configured to perform integrated management of the energy in the plurality of buildings, wherein
each of the energy management devices includes:
a first information generator configured to generate energy management information containing shortage information and surplus information on the energy in the building managed by the energy management device; and
a management information transmitter-receiver configured to receive the energy management information and to transmit the energy management information to the regional energy integrated management device, wherein
the regional energy integrated management device includes:
an information acquisition unit configured to acquire the energy management information from the plurality of energy management devices;
a second information generator configured to generate regional energy management information for mutually adjusting energy supply between different buildings based on the energy management information acquired by the information acquisition unit; and
an instruction transmitter configured to transmit the regional energy management information to the corresponding buildings.

2. The regional energy management system according to claim 1, wherein
the first information generator generates the energy management information by using energy generation status information indicating a status of energy generated by an energy generation device installed in the building, energy storage status information indicating a status of energy stored in an energy storage device installed in the building and electric energy use measured by a wattmeter installed in the building.

3. A regional energy integrated management device configured to manage energy used and generated in a plurality of buildings, comprising:
an information acquisition unit configured to acquire energy management information containing shortage information and surplus information on the energy in the plurality of buildings;
an information generator configured to generate regional energy management information for mutually adjusting energy supply between different buildings in a management target region based on the energy management information on the plurality of buildings acquired by the information acquisition unit; and
an instruction transmitter configured to transmit the regional energy management information to the corresponding buildings.

4. The regional energy integrated management device according to claim 3, wherein
the information generator acquires a demand reduction instruction when the demand reduction instruction is transmitted from an energy supply system configured to manage supply power in the region, and generates building-based demand reduction amount information based on the energy management information on the plurality of buildings acquired by the information acquisition unit, the building-based demand reduction amount information indicating a demand reduction amount allocated to each building from a total demand reduction amount requested by the demand reduction instruction.

5. A regional energy integrated management method using a regional energy integrated management device configured to manage energy used and generated in a plurality of buildings, the method comprising:
an energy management information acquiring step of acquiring energy management information from each of the plurality of buildings, the energy management information containing shortage information and surplus information on the energy in the building;
a regional energy management information generating step of generating regional energy management information for mutually adjusting energy supply between different buildings in a management target region based on the energy management information on the plurality of buildings acquired in the energy management information acquiring step; and
an instruction transmitting step of transmitting the regional energy management information generated in the regional energy management information generating step to the corresponding buildings.

6. The regional energy integrated management method according to claim 5, wherein
the regional energy management information generating step includes: acquiring a demand reduction instruction when the demand reduction instruction is transmitted from an energy supply system configured to manage supply power in the region; and generating building-based demand reduction amount information based on the acquired energy management information on the plurality of buildings, the building-based demand reduction amount information indicating a demand reduction amount allocated to each of the plurality of buildings from a total demand reduction amount requested by the demand reduction instruction.

7. An energy management device for managing energy used, generated, or stored in a building comprising:
an information generator configured to generate energy management information containing shortage information and surplus information on the energy in the building; and
a management information transmitter-receiver configured to receive the energy management information and to transmit the energy management information to an energy integrated management device configured to perform integrated management of energy in buildings including the energy in the building.

8. The energy management device according to claim 7, wherein the information generator is further configured to generate the energy management information by using at least one of energy generation status information indicating a status of energy generated by an energy generation device, energy storage status information indicating a status of energy stored in an energy storage device, and electric energy use measured by a wattmeter.

9. A non-transitory computer-readable medium including a program for causing an energy integrated management device configured to manage energy used and generated in a plurality of buildings to execute:
an energy management information acquiring step of acquiring energy management information from each building, the energy management information containing shortage information and surplus information on the energy in each building;
an energy management information generating step of generating energy management information for mutually adjusting energy supply between different buildings in a management target region based on the energy management information on the plurality of buildings acquired in the energy management information acquiring step; and
an instruction transmitting step of transmitting the energy management information generated in the energy management information generating step to the plurality of buildings.

10. The non-transitory computer-readable medium according to claim 9, wherein
the energy management information generating step includes: acquiring a demand reduction instruction when the demand reduction instruction is transmitted from an energy supply system configured to manage supply power; and generating building-based demand reduction amount information based on the acquired energy management information on the plurality of buildings, the building-based demand reduction amount information indicating a demand reduction amount allocated to each building from a total demand reduction amount requested by the demand reduction instruction.

11. An energy management system comprising:
a plurality of energy management devices each configured to manage energy used, generated, or stored in relation to one of a plurality of buildings; and
an energy integrated management device configured to communicate with the plurality of energy management devices and configured to perform integrated management of the energy relevant to the plurality of buildings in the region, wherein
each energy management device includes:
a first information generator configured to generate energy management information containing shortage information or surplus information on the energy in relation to the building managed by a corresponding one of the energy management devices; and
a management information transmitter configured to transmit the energy management information to the energy integrated management device, wherein the energy integrated management device includes:
an information acquisition unit configured to acquire the energy management information from at least one of the plurality of energy management devices;
a second information generator configured to generate energy management information for controlling the energy integrally managed corresponding to each of the plurality of buildings based on the energy management information acquired by the information acquisition unit; and
an instruction transmitter configured to transmit the energy management information to the corresponding energy management device.

12. The energy management system according to claim 11, wherein
the first information generator is further configured to generate the energy management information by using at lease one of energy generation status information indicating a status of energy generated by an energy generation device, energy storage status information indicating a status of energy stored in an energy storage device, and electric energy use measured by a wattmeter.

13. An energy integrated management device for communicating with an energy management device to manage energy used, generated or stored in relation to a building, and performing integrated management of the energy in relation to buildings, comprising:
an information acquisition unit configured to acquire energy management information from the energy management device, the energy management information containing shortage information or surplus information on the energy in relation to the building;
an information generator configured to generate energy management information for controlling the integrally managed energy in association with buildings based on the energy management information acquired by the information acquisition unit; and
an instruction transmitter configured to transmit the energy management information to the energy management device.

14. The energy integrated management device according to claim 13, wherein
the information generator is further configured to acquire a demand reduction instruction when the demand reduction instruction is transmitted from an energy supply system configured to manage supply power, and to generate building-based demand reduction amount information based on the energy management information on the building acquired by the information acquisition unit, the building-based demand reduction amount information indicating a demand reduction amount allocated to the building from a total demand reduction amount requested by the demand reduction instruction.

15. An energy integrated management method using an energy integrated management device to manage energy used, generated or stored in relation to a plurality of buildings, the method comprising:
an energy management information acquiring step of acquiring energy management information containing shortage information or surplus information on the energy in relation to a building;
an energy management information generating step of generating energy management information for controlling the integrally managed energy in association with each of the plurality of buildings based on the energy management information acquired in the energy management information acquiring step; and
an instruction transmitting step of transmitting the energy management information generated in the energy management information generating step to an energy management device of a corresponding one of the plurality of buildings.

16. The energy integrated management method according to claim 15, wherein
the energy management information generating step includes: acquiring a demand reduction instruction when the demand reduction instruction is transmitted from an energy supply system configured to manage supply power; and generating building-based demand reduction amount information based on the acquired energy management information on the plurality of buildings, the building-based demand reduction amount information indicating a demand reduction amount allocated to each of the plurality of buildings from a total demand reduction amount requested by the demand reduction instruction.

17. An energy management device for managing energy used, generated, or stored in relation to a building comprising:
an information generator configured to generate energy management information containing shortage information or surplus information on the energy in relation to the building; and
a management information transmitter configured to transmit the energy management information to an energy integrated management device to perform integrated management of energy in buildings including the energy in the building.

18. The energy management device according to claim 17, wherein
the information generator is further configured to generate energy management information by using at least one of energy generation status information indicating a status of energy generated by an energy generation device, energy storage status information indicating a status of energy stored in an energy storage device, and electric energy use measured by a wattmeter.

19. A non-transitory computer-readable medium including a program for causing an energy integrated management device configured to manage energy used or generated in relation to a plurality of buildings to execute:
an energy management information acquiring step of acquiring energy management information containing shortage information or surplus information on the energy in relation to one of the plurality of buildings;
an energy management information generating step of generating energy management information for controlling the integrally managed energy in association with buildings based on the energy management information acquired in the energy management information acquiring step; and
an instruction transmitting step of transmitting the energy management information generated in the energy management information generating step to an energy management device configured to manage energy used, generated or stored in relation to a corresponding one of the plurality of buildings.

20. The non-transitory computer-readable medium according to claim 19, wherein
the energy management information generating step includes: acquiring a demand reduction instruction when the demand reduction instruction is transmitted from an energy supply system configured to manage supply power; and generating building-based demand reduction amount information based on the acquired energy management information on the plurality of buildings, the building-based demand reduction amount information indicating a demand reduction amount allocated to each of the plurality of buildings from a total demand reduction amount requested by the demand reduction instruction.

\* \* \* \* \*